No. 818,342.  
PATENTED APR. 17, 1906.  
J. T. BELL.  
FRUIT PICKER.  
APPLICATION FILED FEB. 20, 1906.
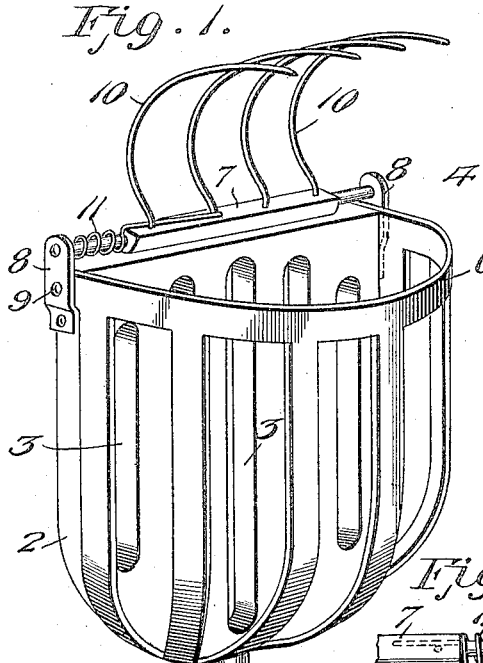
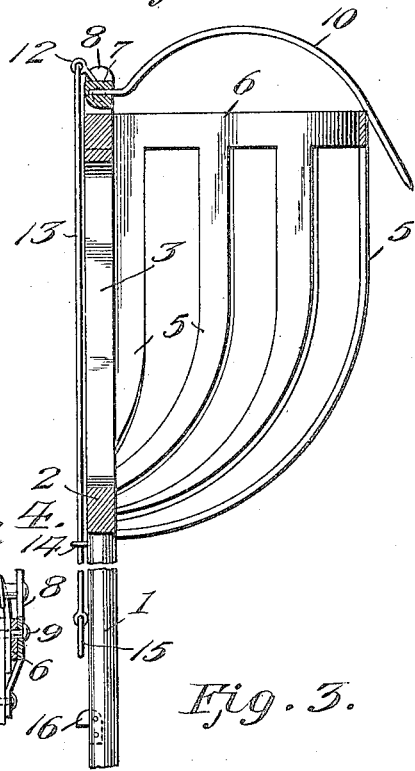
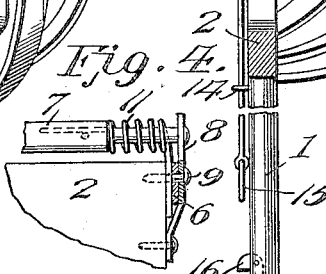
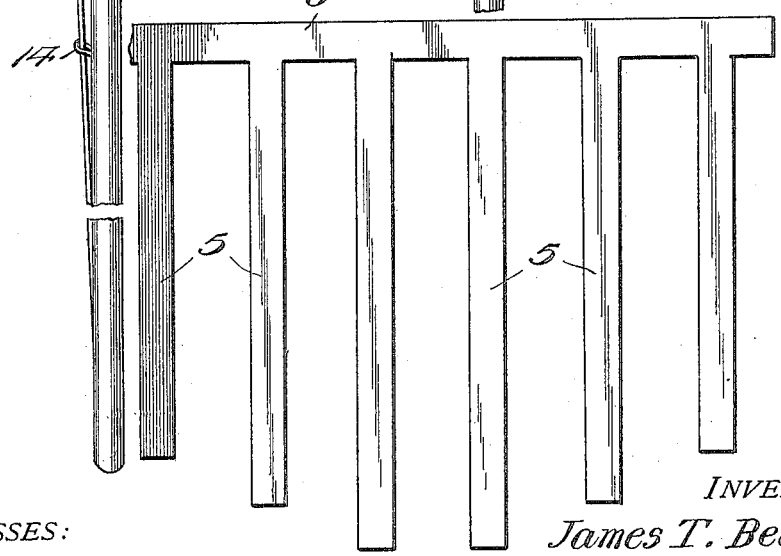
WITNESSES:  
Frank B. Hoffman.  
F. S. Edmore.
INVENTOR  
James T. Bell  
BY Victor J. Evans.  
Attorney

UNITED STATES PATENT OFFICE.

JAMES T. BELL, OF LANSING, MICHIGAN.

FRUIT-PICKER.

No. 818,342.　　　　　Specification of Letters Patent.　　　Patented April 17, 1906.

Application filed February 20, 1906. Serial No. 302,080.

*To all whom it may concern:*

Be it known that I, JAMES T. BELL, a citizen of the United States, residing at Lansing, in the county of Ingham and State of Michigan, have invented new and useful Improvements in Fruit-Pickers, of which the following is a specification.

This invention relates to fruit-pickers of the type employed for gathering fruit from trees, and has for its objects to produce a comparatively simple inexpensive device of this character whereby the fruit may be readily gathered and this without injuring the fruit, one in which the basket or receptacle may after being filled be conveniently closed, and one from which the fruit may be readily discharged when desired.

With these and other objects in view the invention comprises the novel features of construction and combination of parts more fully hereinafter described.

In the accompanying drawings, Figure 1 is a perspective view of a fruit-picker embodying the invention. Fig. 2 is a side elevation of the same, partly in central longitudinal section. Fig. 3 is a detail view of the basket-blank. Fig. 4 is a detail view of a portion of the picking member or fork.

Referring to the drawings, 1 designates a handle or shank provided at its upper end with a flat head-piece 2, having a plurality of longitudinal slots or openings 3 and constituting one wall of a basket or receptacle 4, which comprises a plurality of relatively spaced slats or strips 5, connected at their normally upper ends by and formed in a single piece with a connecting web or strip 6, the terminals of which project beyond the terminal slats 5 for attachment to the head-piece 2, as more fully hereinafter explained, while the initially free ends of the slats are bent inward and attached to the lower edge of the head-piece 2.

Extending across the forward or upper edge of the base-piece 2 is a member or shaft 7, journaled for rotation in bearing members or ears 8, attached to the side edges of and projecting forwardly beyond the base-piece 2, said ears being secured by fastening members 9, which subserve the further function of attaching the terminals of the connecting-web 6 to the head-piece 2, as seen more clearly in Fig. 4. The member or shaft 7 carries a plurality of relatively spaced fruit-engaging tines or fingers 10, preferably curved, as shown, and adapted when in closed position, as seen in Fig. 2, to form a closure for the upper open end of the receptacle 4, there being arranged upon the shaft 7 a spring 11, having one end engaged with the head-piece 2 and the other end with the shaft and serving to rotate the latter in a direction for maintaining the picker device in closed condition.

Fixed to and projecting from the shaft 7 is an arm 12, with which is engaged one end of a traction cord or element 13, arranged to travel through a guide 14 on the handle 1 and equipped at its other end with an engaging member or ring 15, adapted for engagement with a projecting hook or keeper 16, fixed to the handle, said cord being adapted for operation to rotate the shaft 7 against the action of spring 11 for swinging the tines 10 to open position, as in Fig. 1.

In practice the picker-fingers 10 are raised to the position illustrated in Fig. 1 by drawing downward on the element 13 and are locked in such position by engaging the ring 15, with the keeper 16, with the fingers. In this condition they are engaged with the fruit to be picked, which when pulled from the stem will fall into the basket or receptacle 4, and after the same has become filled the element 13 is released, whereupon the spring 11 will swing the shaft to position with the fingers extending across and closing the mouth of the basket, thus to obviate escape of the fruit therefrom. When it is desired to dump the basket, the cord is manipulated for raising the fingers to open position and permit discharge of the fruit. It is to be particularly noted that under this construction the cost of the device as a whole is materially reduced owing to the formation of the basket by means of the base-piece 2 and the open-work blank 5 6.

Having thus described my invention, what I claim is—

In a fruit-picker, a handle, a receptacle carried thereby, a shaft journaled at the forward end of the receptacle and provided with a plurality of picker-fingers adapted to close the mouth of the receptacle, a spring acting on the shaft to hold the fingers in closed position, a traction element operatively connected with the shaft, and a keeper provided on the handle for engagement by said element to lock the fingers in open position.

In testimony whereof I affix my signature in presence of two witnesses.

JAMES T. BELL.

Witnesses:
JOHN W. ALLEN,
WALTER S. FOSTER.